United States Patent
Fenner et al.

(10) Patent No.: US 12,348,480 B2
(45) Date of Patent: Jul. 1, 2025

(54) DEVICE NETWORK ADDRESS AND NETWORK PREFIX CORRELATION

(71) Applicant: Arista Networks, Inc., Santa Clara, CA (US)

(72) Inventors: William Fenner, Chester Springs, PA (US); Eamon Doyle, Dublin (IE)

(73) Assignee: Arista Networks, Inc., Santa Clara, CA (US)

(*) Notice: Subject to any disclaimer, the term of this patent is extended or adjusted under 35 U.S.C. 154(b) by 0 days.

(21) Appl. No.: 18/169,614

(22) Filed: Feb. 15, 2023

(65) Prior Publication Data

US 2024/0275759 A1    Aug. 15, 2024

(51) Int. Cl.
*H04L 61/3015* (2022.01)
*H04L 41/0894* (2022.01)
*H04L 61/5014* (2022.01)
*H04L 101/35* (2022.01)
*H04L 101/659* (2022.01)

(52) U.S. Cl.
CPC ...... *H04L 61/3015* (2013.01); *H04L 41/0894* (2022.05); *H04L 61/5014* (2022.05); *H04L 2101/35* (2022.05); *H04L 2101/659* (2022.05)

(58) Field of Classification Search
CPC ............. H04L 41/0894; H04L 61/3015; H04L 61/5014; H04L 2101/35; H04L 2101/659
See application file for complete search history.

(56) References Cited

U.S. PATENT DOCUMENTS

| | | | |
|---|---|---|---|
| 2009/0161668 A1* | 6/2009 | Mullooly | H04L 47/31 370/389 |
| 2010/0049837 A1* | 2/2010 | Ji | H04L 41/0843 715/236 |
| 2010/0223363 A1* | 9/2010 | Sarikaya | H04W 40/24 709/242 |
| 2018/0139685 A1* | 5/2018 | Wei | H04W 8/087 |
| 2020/0267115 A1* | 8/2020 | Albrecht | H04L 61/5092 |

OTHER PUBLICATIONS

Suzanne Goldlust, How can I work around IPv6 prefix length issues with ISC DHCP clients?, ISC, Oct. 26, 2018, Internet Systems Consortium.
T. Narten et al., Neighbor Discovery for IP version 6 (IPv6), Network Working Group, Sep. 2007, The IETF Trust.
H. Singh et al., IPv6 Subnet Model: The Relationship between Links and Subnet Prefixes, Internet Engineering Task Force (IETF), Jul. 2010, ISSN: 2070-1721, The IETF Trust.
T. Mrugalski et al., Dynamic Host Configuration Protocol for IPV6 (DHCPv6), Internet Engineering Task Force (IETF), Nov. 2018, ISSN: 2070-1721, The IETF Trust.

* cited by examiner

*Primary Examiner* — Gil H. Lee
(74) *Attorney, Agent, or Firm* — Treyz Law Group, P.C.; Tianyi He

(57) ABSTRACT

A network device may obtain its Internet Protocol (IP) address information. The network device may receive a device network address assignment message that indicates an IP address of the network device. The network device may receive a router advertisement message that indicates an IP address prefix that includes the IP address and that indicates a prefix length of the IP address prefix. The network device may form an IP interface that specifies the IP address and the prefix length.

20 Claims, 6 Drawing Sheets

DEVICE NETWORK ADDRESS AND NETWORK PREFIX CORRELATION

BACKGROUND

This relates to network devices, and more particularly, to un-provisioned network devices.

Provisioning a network device for use can often take excessive effort. It may generally be desirable to simplify the provisioning process for network devices while still properly configuring the network devices for operation. As examples, a network device may be configured for zero-touch provisioning or secure zero-touch provisioning to simplify the provisioning process.

DETAILED DESCRIPTION

A network can convey network traffic (e.g., in the form of packets, frames, etc.) between host devices. To properly route and forward the network traffic, the network can include a number of network devices configured with networking data such as forwarding decision data, routing decision data, network policy information, etc.

Network devices typically require provisioning and the reception of configuration data (e.g., networking data) to be operational within the network. To simplify the process of provisioning or configuring a network device for operation, the network device may initiate its own provisioning operation at least in part to obtain its network address such as its IPv6 (Internet Protocol version 6) address. The network device may receive its network address from a network address assignment server (e.g., a server implementing DHCP (Dynamic Host Configuration Protocol) such as DHCPv6). The network device may compare at least a portion of its network address to network address prefix information received in router advertisements from one or more routers on the local segment or subnet. Based on any matching network address prefix information, the network device may obtain the appropriate network prefix such as an IPv6 address prefix associated with its network address.

This correlation between the device network address from a network address assignment server and the network address prefix from a router provides a reliable mechanism to obtain an accurate network prefix (length), which may be absent from the device network address assignment message from the network address assignment server. The network device may subsequently use its network address and the appropriate network address prefix to provide communication interfaces for further communications in the provisioning operation such as communications with a device configuration server or a bootstrap server.

Configurations in which an un-provisioned network device obtains and correlates device network address information and network prefix information from different sources for its own provisioning operation are sometimes described herein as an illustrative example. If desired, other types of network devices may similarly obtain and correlate device network address information and network prefix information received from different sources in connection with other types of device processes or operations. An illustrative networking system in which a network device obtains and correlates device network address information and network prefix information received from different sources is shown in FIG. 1.

Figure 1:
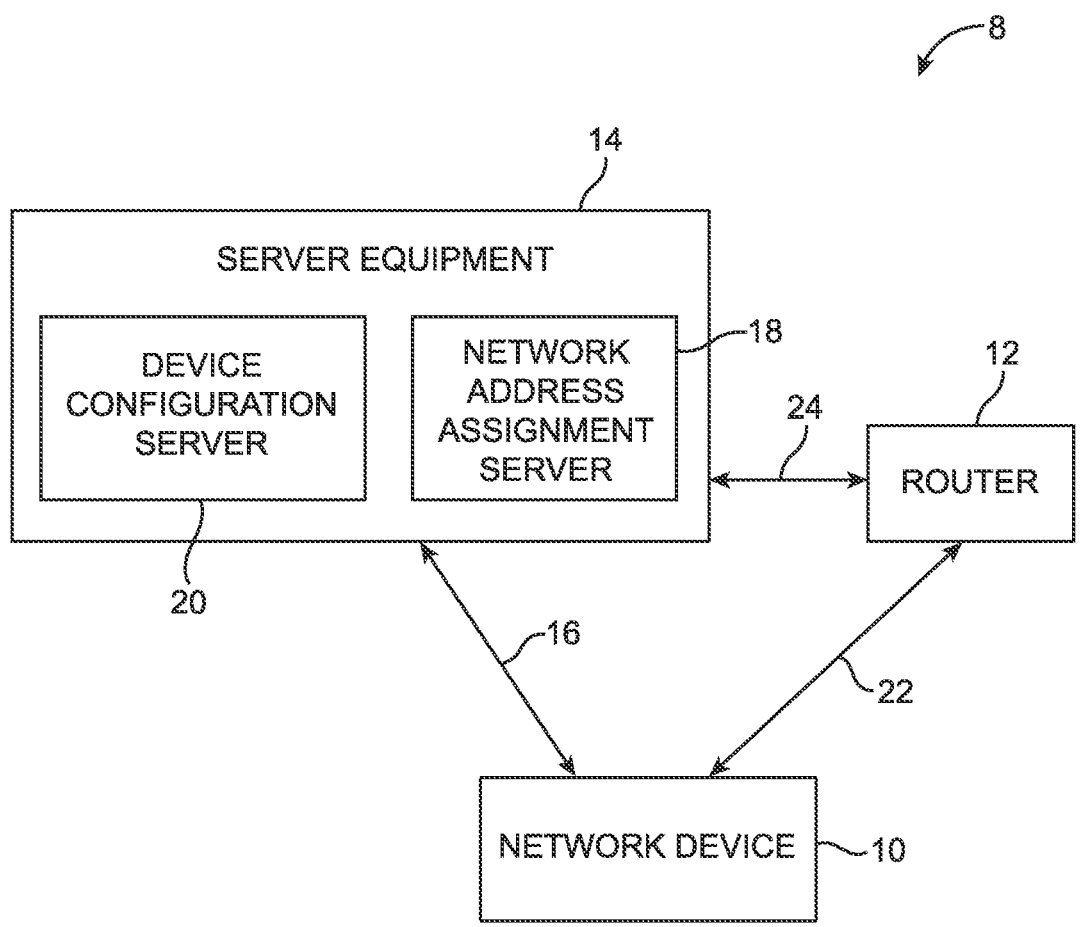
FIG. 1 is a diagram of an illustrative network to which an initially un-provisioned network device is coupled in accordance with some embodiments.

FIG. 1 shows an illustrative network (portion) 8 which may be of any suitable scope and/or form part of a larger network of any suitable scope. As examples, network 8 may include, be, or form part of a local segment, a local subnet, a local area network (LAN), a campus area network, a wide area network, etc. Network 8 may include any suitable number of different network devices that connect corresponding host devices of network 8 to one another. At least some of these network devices may be connected by one or more wired technologies or standards such as Ethernet (e.g., using copper cables and/or fiber optic cables), thereby forming a wired network portion. If desired, network 8 may also include a wireless network portion coupled to the wired network portion. If desired, network 8 may include or be coupled to internet service provider networks (e.g., the Internet) or other public service provider networks, private service provider networks (e.g., multiprotocol label switching (MPLS) networks), and/or other types of networks such as telecommunication service provider networks (e.g., a cellular network based on one or more standards as described in the 3GPP specifications such as GSM, UMTS, LTE, 5G, etc.).

In general, network devices in network 8 can include any number of switches (e.g., a multi-layer switch), bridges, routers or gateways, hubs, repeaters, firewalls, wireless access points, network devices serving other networking functions, network devices that include the functionality of two or more of these devices, management devices that control the operation of one or more of these network devices, and/or other types of network devices.

In the example of FIG. 1, the network devices of network 8 includes at least network device 10 such as a multi-layer L2/L3 switch and router 12. Network 8 may also include one or more host devices or host equipment such as server equipment 14. Configurations in which network device 10 is an un-provisioned network device (e.g., not a fully provisioned or not fully configured network device) when initially coupled or connected to other elements of network 8 are sometimes described herein as an illustrative example.

In these configurations, network device 10 may communicate with different portions of server equipment 14 via one or more communication paths 16 in an attempt to perform a network device provisioning operation that provisions and configures device 10 itself for operation. In particular, network device 10 may first communicate with a network address assignment server 18 implemented on server equipment 14 (e.g., a DHCP server such as a DHCPv6 (Dynamic Host Configuration Protocol version 6) server, a server that uses a variation of DHCP, a server that is compliant with only some portions of DHCP, etc.) to obtain a network address for network device 10. After obtaining its network address, network device 10 may then communicate with a device configuration server 20 implemented on server equipment 14 (sometimes referred to as a bootstrap server 20) to obtain configuration data, configuration instructions such as executable scripts, and/or generally configuration files. Network device 10 may be considered fully provisioned and ready to perform network operations (e.g., traffic routing, routing protocols, traffic forwarding, etc.) after successfully executing the obtained configuration instructions, storing the obtained configuration data, and/or generally processing the obtained configuration files, as examples. While both shown in FIG. 1 to be within server equipment 14, servers 18 and 20 may be implemented on distinct and separate pieces of server computing equipment (e.g., on different processing circuitry or processors, on the same or different server racks) at server equipment 14 or on shared computing equipment at server equipment 14.

Before, when, and/or after communicating with server equipment 14 as part of the device provisioning operation, network device 10 may be in communication with router 12 via one or more communication paths 22. Router 12 may be a router on the same local segment or subnet as network device 10 and server equipment 14, an edge router or gateway, a core router, a virtual router implemented on server equipment, or generally a router implemented in any suitable manner at any suitable location within network 8. Router 12 may be communicatively coupled to server equipment 14 via one or more communication paths 24.

Communication paths 16, 22, and 24 may be implemented using network paths of network 8. These network paths may include direct cable connections with or without intervening network devices. In other words, each path 16, each path 22, each path 24 may span across portions of network 8 (e.g., one or more network devices therein) to provide the connectivity illustrated in FIG. 1. While shown as separate paths, paths 16, 22, and 24 may include paths or path portions that overlap one another.

In one illustrative arrangement, a given path 16 may be implemented by paths 22 and 24 and intervening router 12. In this arrangement, network device 10 may lack a direct connection to server equipment 14 and any connection between network device 10 and server equipment 14 includes router 12 (e.g., serving as a relay device). In particular, router 12 may contain a relay agent executing on the processing circuitry on router 12 to perform relaying of address assignment messages (e.g., address assignment messages described in connection with FIG. 3 such as DHCP request and reply messages) for network device 10 and server equipment 14. This relaying of DHCP messages and/or other types of messages occurs prior to device 10 having or being assigned a network address and thus will differ from normal packet forwarding (e.g., forwarding of packets that identify the network address of device 10).

If desired, other routers and/or other network devices (e.g., in addition to router 12) may also serve as relay devices to relay DHCP messages between device 10 and server equipment 14. As an illustrative example, an intervening router coupled along path 24 (e.g., between router 12 and server equipment 14) may also contain a relay agent executing on its processing circuitry. This intervening router along path 24 and router 12 may collectively relay the DHCP messages. In general, any number of intervening (relay) devices (e.g., zero, one, two, etc.) at any suitable locations (e.g., along path 22 and/or path 24) may be involved in the conveyance of address assignment messages between network device 10 and server equipment 14.

Figure 2:
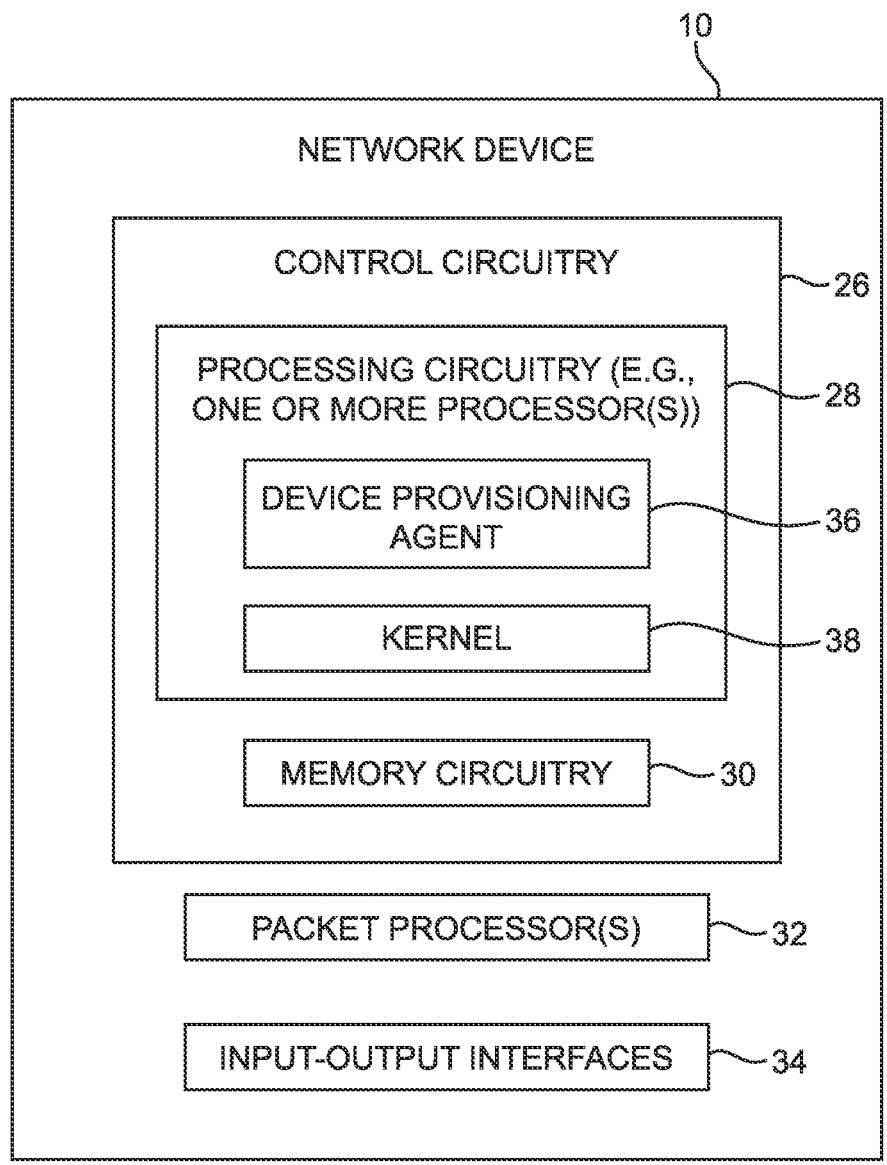
FIG. 2 is a diagram of an illustrative network device in accordance with some embodiments.

FIG. 2 is a diagram of an illustrative network device such as network device 10 in FIG. 1. In some configurations described herein as an illustrative example, network device 10 may be an un-provisioned multi-layer switch or other type of network device that automatically initiates a device provisioning operation to provision itself after being introduced to network 8 in FIG. 1 (e.g., after being communicatively coupled to components of network 8 such as router 12 and/or server equipment 14).

As shown in FIG. 2, network device 10 may include control circuitry 26 having processing circuitry 28 and memory circuitry 30, one or more packet processors 32, and input-output interfaces 34 disposed within a housing of network device 10. The housing may include an exterior cover (e.g., a plastic exterior shell, a metal exterior shell, or an exterior shell formed from other rigid or semi-rigid materials) that provides structural support and protection for the components of network device 10 mounted within the housing. In one illustrative arrangement, network device 10 may be or form part of a modular network device system (e.g., a modular switch system having removably coupled modules usable to flexibly expand characteristics and capabilities of the modular switch system such as to increase ports, provide specialized functionalities, etc.). In another illustrative arrangement, network device 10 may be a fixed-configuration network device (e.g., a fixed-configuration switch having a fixed number of ports and/or a fixed hardware configuration).

Processing circuitry 28 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Processing circuitry 28 may run (e.g., execute) a network device operating system and/or other software/firmware that is stored on memory circuitry 30. Memory circuitry 30 may include non-transitory (tangible) computer readable storage media that stores the operating system software and/or any other software code, sometimes referred to as program instructions, software, data, instructions, or code. As an example, the network device self-provisioning functions described herein may be stored as (software) instructions on the non-transitory computer-readable storage media (e.g., in portion(s) of memory circuitry 30 in network device 10). The corresponding processing circuitry (e.g., one or more processors of processing circuitry 28 in network device 10) may process or execute the respective instructions to perform the corresponding provisioning operations. Memory circuitry 30 may be implemented using non-volatile memory (e.g., flash memory or other electrically-programmable read-only memory configured to form a solid-state drive), volatile memory (e.g., static or dynamic random-access memory), hard disk drive storage, removable storage devices (e.g., storage device removably coupled to device 10), and/or other storage circuitry. Processing circuitry 28 and memory circuitry 30 as described above may sometimes be referred to collectively as control circuitry 26 (e.g., implementing a control plane of network device 10).

As examples in additional to device provisioning operations, processing circuitry 28 may execute network device control plane software such as operating system software, routing policy management software, routing protocol agents or processes, routing information base agents, and other control software, may be used to support the operation of protocol clients and/or servers (e.g., to form some or all of a communications protocol stack such as the TCP/IP stack), may be used to support the operation of packet processor(s) 32, may store packet forwarding information, may execute packet processing software, and/or may execute other software instructions that control the functions of network device 10 and the other components therein. Some of these operations such as those associated with routing policy management software, routing protocol agents or processes, routing information base agents, and packet processing software may occur after the device provisioning operation has successfully completed.

Packet processor(s) 32 may be used to implement a data plane or forwarding plane of network device 10. Packet processor(s) 32 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Packet processor 32 may receive incoming network traffic via input-output interfaces 34, parse and analyze the received network traffic, process the network traffic based on packet forwarding decision data (e.g., in a forwarding information base) and/or in accordance with network protocol(s) or other forwarding policy, and forward (or drop) the network traffic accordingly. The packet forwarding decision data may be stored on a portion of memory circuitry 30 and/or other memory circuitry integrated as part of or separate from packet processor 32.

Input-output interfaces 34 may include different types of communication interfaces such as Ethernet interfaces (e.g., one or more Ethernet ports), optical interfaces, a Bluetooth interface, a Wi-Fi interface, and/or other networking interfaces for connecting network device 10 to the Internet, a local area network, a wide area network, a mobile network, and generally other network device(s), peripheral devices, and other computing equipment (e.g., host equipment such as server equipment, user equipment, etc.). As an example, input-output interfaces 34 may include ports or sockets to which corresponding mating connectors of external components can be physically coupled and electrically connected. Ports may have different form-factors to accommodate different cables, different modules, different devices, or generally different external equipment.

In configurations in which network device 10 is an initially un-provisioned network device, processing circuitry 28 on network device 10 may execute a device provisioning agent 36 that helps manage and facilitate the device (self-)provisioning operation described in connection with FIG. 1 after the initially un-provisioned device 10 is supplied with power and is communicatively coupled to router 12 and/or server equipment 14. If desired, this provisioning operation may be initiated automatically by executing agent 36 based on one or more criteria being met. The one or more criteria can include network device 10 being connected to a power source, network device 10 being coupled to one or more elements of network 8, network device 10 receiving one or more user inputs such as the pressing of a button, the providing of a key or other security element, or generally any specified input via a user interface, and/or other suitable provisioning criteria. Configured in this manner, network device 10 may sometimes be referred to herein as a network device configured for secure zero-touch provisioning, zero-touch provisioning, one-touch provisioning, or minimal-touch provisioning.

Processing circuitry 28 may also execute threads or tasks for a kernel such as kernel 38. Kernel 38 may, among numerous other functions, implement communication interfaces based on communication protocols (e.g., transport layer protocols, network layer protocols, data link layer protocols, etc.) and form corresponding communication sockets, thereby implementing a communication protocol stack (e.g., a TCP/IP stack) with which network device 10 can communicate with external equipment.

As part of the device provisioning operation, device 10 (e.g., device provisioning agent 36) may obtain device network address information such as the network (e.g., IP or more specifically IPv6) address of network device 10 from network address assignment server 18. Kernel 38 may receive the network address information to form one or more network layer interfaces (e.g., one or more IPv6 interfaces) based on the received device network address information for device 10. Device provisioning agent 36 may subsequently communicate with device configuration server 20 to obtain configuration files (e.g., configuration scripts, configuration data such as routing and forwarding decision data, network policy information, etc.) via the network interfaces established by kernel 38.

Processing circuitry may execute device provisioning agent 36 and kernel 38 by executing software instructions stored on memory circuitry 30. While device provisioning agent 36 and kernel 38 are described to perform respective parts of the device provisioning operation for provisioning device 10, this is merely illustrative. Processing circuitry 28 may be organized in any suitable manner (e.g., to have any other agents or processes instead of or in addition to device provisioning agent 36 and/or kernel 38) to perform each part of the device provisioning operation. Accordingly, processing circuitry 28 may sometimes be described herein to perform the device provisioning operation instead of specifically referring to the one or more agents, processes, and/or kernel executed by processing circuitry 28.

Figure 3:
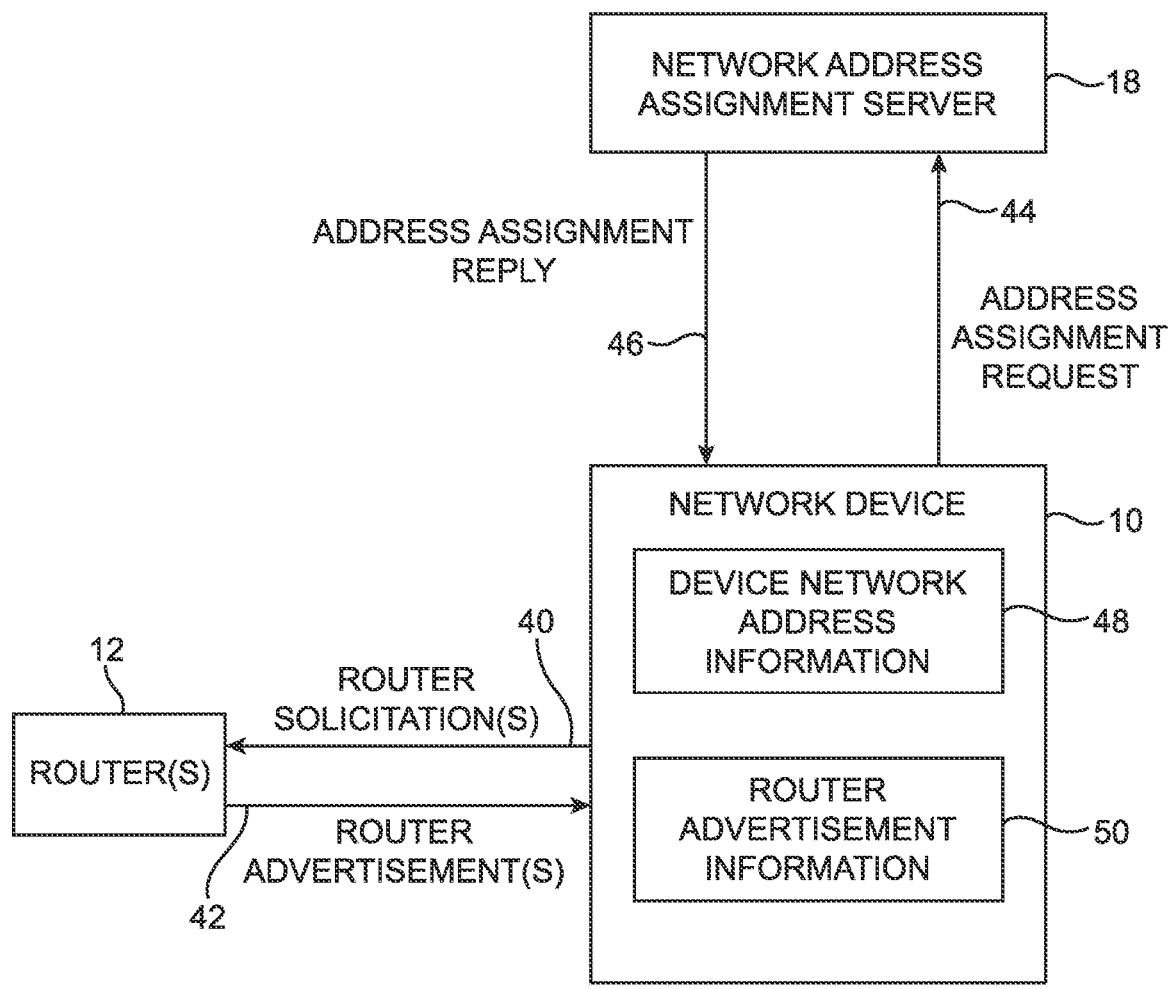
FIG. 3 is a diagram of illustrative communications performed with an un-provisioned network device in accordance with some embodiments.

FIG. 3 is a diagram of illustrative messages conveyed between network device 10 and router 12 and between network device 10 and network address assignment server 18 within the networking system of FIG. 1. As shown in FIG. 3, network device 10 may communicate with one or more local routers such as router 12. In particular, network device 10 may send (e.g., multicast) a router solicitation message 40 to each of these local routers on the local segment or subnet. In response, router 12 (and any additional local routers) may be prompted to respond with a router advertisement message 42. Router 12 and any additional local routers may also periodically provide unsolicited router advertisement messages 42 (e.g., not in response to message 40) to network device 10.

The initial (solicited) router advertisement message 42 may provide an indication to network device 10 (e.g., via an Other Configuration flag that is set in message 42) that network device 10 can obtain its network address via DHCP (e.g., DHCPv6) from network address assignment server 18. Configurations in which network device 10 uses DHCPv6 to obtain an IPv6 address from server 18 implementing DHCPv6 is described herein as an illustrative example. If desired, other network address assignment protocols may be indicated by router 12 and used by device 10 to obtain its network address.

To obtain its network address from server 18, network device 10 may send an address assignment request message 44 (e.g., a DHCPv6 request message 44) indicating a device network address (e.g., an IPv6 address) for assignment to network device 10. In response to address assignment request message 44, server 18 may send an address assignment reply (or acknowledgement) message 46 indicating and confirming that assignment of the device network address (e.g., the IPv6 address) to network device 10. Address assignment reply message 46 may confirm or complete the assignment of the network address to network device 10 and may therefore sometimes be referred to herein as a device address assignment message (e.g., a device IP address assignment message). While not explicitly shown in the example of FIG. 3, network device 10 and server 18 (and, if desired, network device 10 and other servers) may exchange other messages prior to messages 44 and 46. As an example, network device 10 may exchange DHCP solicit and advertise messages with one or more DHCP servers (e.g., server 18) prior to the sending of request message 44 to server 18.

The use of DHCPv6 and corresponding DHCPv6 messages is merely illustrative. If desired, network device 10 may generally communicate with network address assignment server 18 to obtain its network address and/or any other network address information using messages based on DHCP or non-DHCP messages.

In general, the communication of messages 44 and 46 and other DHCP or non-DHCP address assignment messages may occur via one or more network paths (e.g., paths 16 in FIG. 1) between network device 10 and network address assignment server 18 (e.g., the server equipment 14 implemented thereon). One such illustrative network path can include any suitable number of intervening relay devices between device 10 and server 18 (e.g., no relay devices, one or more relay devices implemented by router 12, by one or more routers coupled along path 24 in FIG. 1, by one or more routers coupled along path 16 in FIG. 1, and/or by one or more routers coupled along path 22, etc.) that relay these messages between device 10 and server 18.

Network device 10 may store and maintain the assigned device network address and/or other network address information received from server 18 (e.g., via message 46 or other messages) as device network address information 48. Network device 10 may also maintain the information sent from one or more routers 12 (e.g., via router advertisement message(s) 42) as router advertisement information 50. Device network address information 48 and router advertisement information 50 may be maintained at memory circuitry 30 (FIG. 2) in device 10 and updated as new information is received (e.g., information in newly received additional router advertisement messages 42 are stored) as an example.

Some or all of the communications described in connection with FIG. 3 may be facilitated by device provisioning agent 36 on processing circuitry 28. In particular, device provisioning agent may send messages 40 and 44 at appropriate times (e.g., send message 44 based on the reception of message 42), may store or otherwise process information in messages 42 and 46, and/or may access and update address information 48 and/or router advertisement information 50 at any suitable time.

Figure 4:
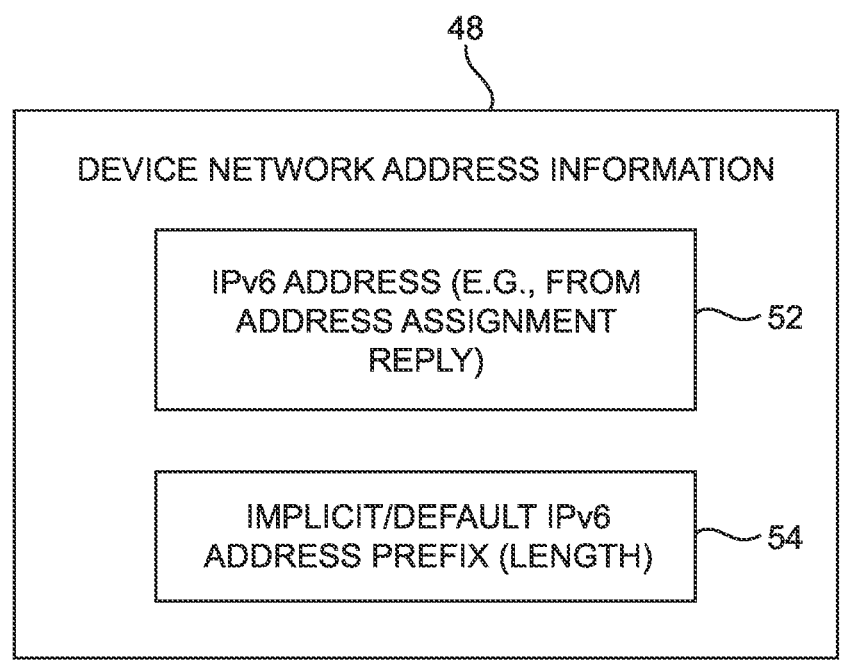
FIG. 4 is a diagram of illustrative device network address information obtained by a network device in accordance with some embodiments.

FIG. 4 is a diagram of illustrative device network address information 48 obtained from network address assignment server 18 and/or stored on device 10. In the example of FIG. 4, device address assignment message 46 from server 18 contains an IPv6 address 52 for assignment to device 10. Processing circuitry 28 may store IPv6 address 52 as part of device network address information 48.

While the assigned IPv6 address is contained in device address assignment message 46, message 46 lacks network prefix or prefix length information such as the IPv6 prefix for local subnet to which the assigned IPv6 address belongs (e.g., lacks an indication of the appropriate IPv6 prefix and prefix length corresponding the assigned IPv6 address). Accordingly, network device 10 cannot obtain the network prefix corresponding to its IPv6 address directly from device address assignment message 46. While network device 10 can assume and use an implicit (e.g., default or pre-determined) IPv6 address prefix length such as a default IPv6 prefix length of 128 or 64, this assumed prefix length may not be accurate or sufficient in some network configurations.

To obtain more accurate network prefix information for the subnet to which network device 10 belongs, network device 10 may correlate assigned IPv6 address 52 from message 46 with network (e.g., subnet) prefix information from other sources such as from router 12, or more specifically, from one or more router advertisement messages 42 from router 12.

Figure 5:
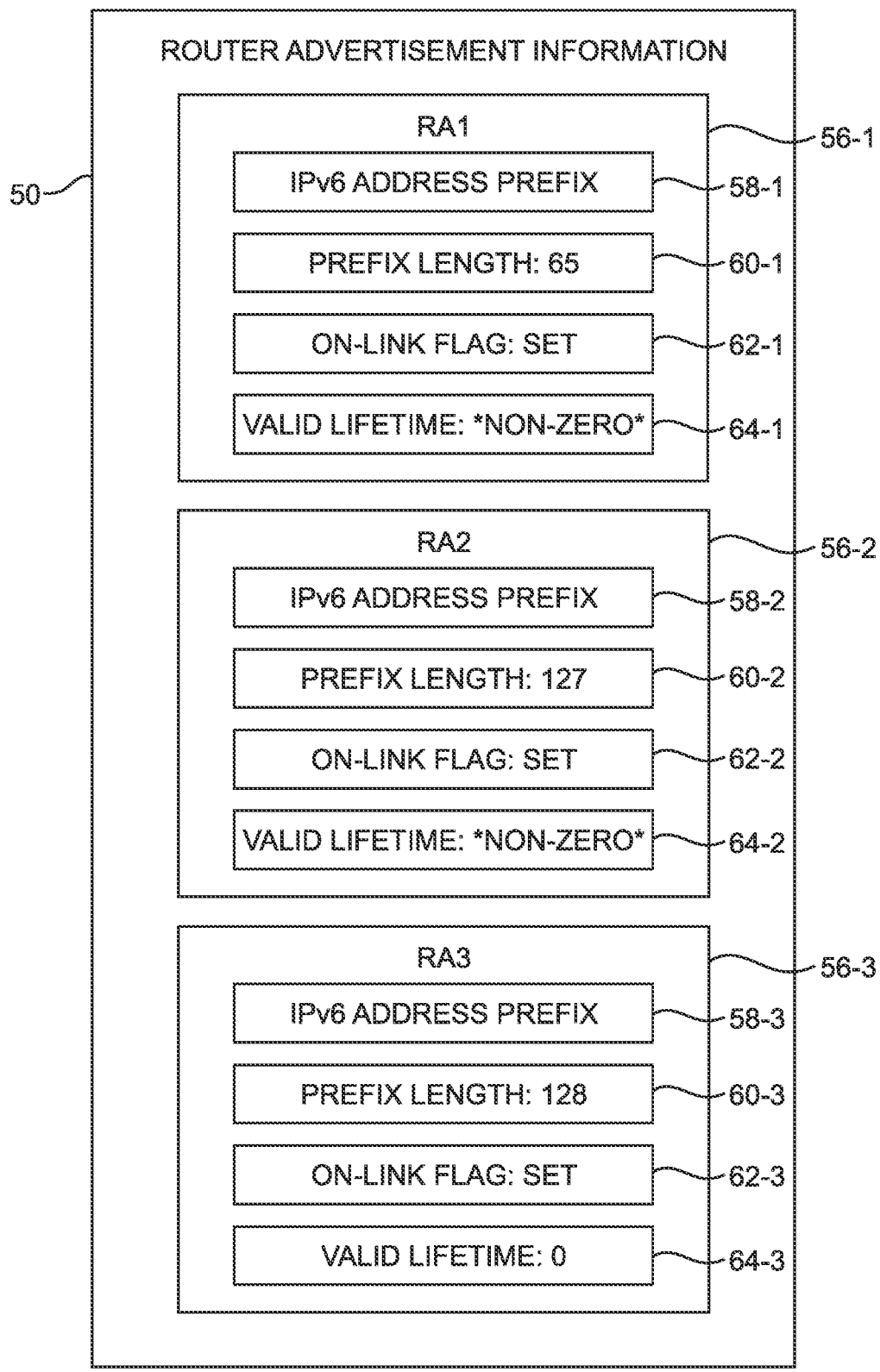
FIG. 5 is a diagram of illustrative router announcement records obtained by a network device in accordance with some embodiments.

FIG. 5 is a diagram of illustrative router advertisement information 50 obtained from one or more router advertisement messages 42 (e.g., from router 12 and/or other routers) and stored at network device 10. In particular, network device 10 may have received a number of different router advertisement messages over time (e.g., as the network and/or subnet configuration changes over time and corresponding router advertisement message conveying these changes are received by network device 10). Network device 10 may store the information in these router advertisement messages 42 as corresponding records 56 in router advertisement information 50.

The record 56 for each router advertisement message may include some or all of the information present in the corresponding router advertisement message 42. As an example, each record 56 can include an IPv6 address prefix 58, a prefix length 60, an on-link flag 62, and a valid lifetime as advertised in message 42. These different types of information are merely illustrative. If desired, other types of information in message 42 may also be stored in each record 56.

Any number of records 56 in router advertisement information 50 may contain an IPv6 address prefix 58 that contains or matches the assigned IPv6 address 52 (FIG. 4). Accordingly, network device 10 (e.g., device provisioning agent 36 on processing circuitry 28) may compare the assigned IPv6 address 52 to the IPv6 address prefix 58 of one or more (e.g., each) record(s) 56. A valid record 56 with the longest IPv6 address prefix that matches the assigned IPv6 address of network device 10 and therefore has the longest prefix length 60 of the matching records 56 may be used as the network prefix length for the assigned IPv6 address 52 for device 10. Network device 10 (e.g., device provisioning agent 36 on processing circuitry 28) may determine the validity of a record 56 based on the record 56 having an on-link flag that is set (e.g., has a set or enabled value of 1) and having a valid lifetime value that is non-zero. The on-link flag being set may indicate that the specified IPv6 address prefix in the same record is assigned to the link upon which the router advertisement is advertised (e.g., addresses on the specified IPv6 address prefix can be reached on the link without necessarily going through a router). The valid lifetime may provide the length of time during which the corresponding IPv6 address prefix in the same record is valid (e.g., with a '0' value indicating an already invalid IPv6 address prefix and a non-zero value indicating a currently valid IPv6 address prefix set to expire after the non-zero value).

In illustrative scenarios in which router advertisement information 50 contains only one valid record 56 having a matching IPv6 address prefix 58 (e.g., a IPv6 address prefix 58 that contains the assigned IPv6 address 52 and matches the assigned IPv6 address 52 up to the prefix length 60), network device 10 may use the specified prefix length 60 in the one record 56 as the prefix length of the subnet containing network device 10. As an example, if router advertisement information 50 only contained record 56-1 (e.g., corresponding to information received in a first router advertisement message 42 from router 12) and not records 56-2 and 56-3 (e.g., not any other records corresponding to information received in other router advertisement messages 42 from router 12), network device 10 may use the value of prefix length 60-1, which is 65, as the subnet prefix length. As such, device provisioning agent 36 may provide prefix length 60-1 (having a value 65) in combination with the assigned IPv6 address 52 of network device 10 to kernel 38 to provide one or more IPv6 interfaces for network device 10.

In illustrative scenarios in which router advertisement information 50 contains multiple valid records having matching IPv6 address prefixes 58 (e.g., multiple IPv6 address prefixes 58 that contain the assigned IPv6 address 52 and matches the assigned IPv6 address 52 up to the corresponding prefix length 60), the network device may use the longest specified prefix length 60 out of multiple records 56 as the prefix length of the subnet containing network device 10. As an example, if the router announcement information 50 only contained records 58-1 and 58-2 and not record 58-3, network device 10 may use the value of prefix length 60-2, which is 127, as the subnet prefix length (e.g., because the prefix length value of 127 in record 56-2 is greater than the prefix length value of 65 in record 56-1). As such, device provisioning agent 36 may provide prefix length 60-2 (having a value 127) in combination with the assigned IPv6 address 52 of network device 10 to kernel 38 to provide one or more IPv6 interfaces for network device 10.

If desired, device provisioning agent 36 may validate each of records 56 prior to the matching of device IPv6 address 52 to corresponding IPv6 prefixes 60 and/or prior to providing the selected prefix length information 60 to kernel 38. In particular, device provisioning agent 36 validates each record 56 by checking that both on-link flag 62 in that record 56 is set (e.g., has a set or enabled value) and that the value of its valid lifetime 64 is non-zero. As an example, if router announcement information 50 contained all three records 56-1, 56-2, and 56-3, network device 10 may use prefix length 60-2, which has a value of 127 as the prefix length of the subnet because record 56-2 specifies the largest (e.g., longest) prefix length out of all of the valid records 56-1 and 56-2 (e.g., record 56-3 is invalid because of its valid lifetime value being zero). As such, device provisioning agent 36 may provide prefix length 60-2 (having a value 127) in combination with the assigned IPv6 address 52 of network device 10 to kernel 38 to provide one or more IPv6 interfaces at network device 10.

If router advertisement information 50 contains no valid records with a IPv6 address prefix 58 matching the assigned device IPv6 address 52, device provisioning agent 36 may provide default IPv6 address prefix length 54 (e.g., having a value of 64 or 128) in combination with the assigned IPv6 address 52 of network device 10 to kernel 38 to provide one or more IPv6 interfaces for network device 10.

In fact, even in scenarios in which a more accurate subnet prefix length is obtained (e.g., from router advertisement record 56-1 or from router advertisement record 56-2), device provisioning agent 36 may still provide the default IPv6 address prefix length 54 (e.g., having a value of 64 or 128) along with the assigned device IPv6 address 52 to kernel 38. In addition to providing this device address assignment message information to kernel 38, device provisioning agent 36 may also provide the more accurate on-link prefix length as part of the router advertisement message information. Kernel 38 may provide one or more IPv6 interfaces based on the information from both sources (e.g., device address assignment message 46 and router advertisement message 42) by selectively using the assigned device IPv6 address 52 and the more accurate on-link prefix length.

FIGS. 4 and 5 are merely illustrative. If desired, other types of information (e.g., other types of network addresses) may be stored as device network address information 48 and as router advertisement information 50. If desired, any suitable number of router advertisement records (e.g., for any number of different subnets) may be present in router advertisement information 50.

Figure 6:
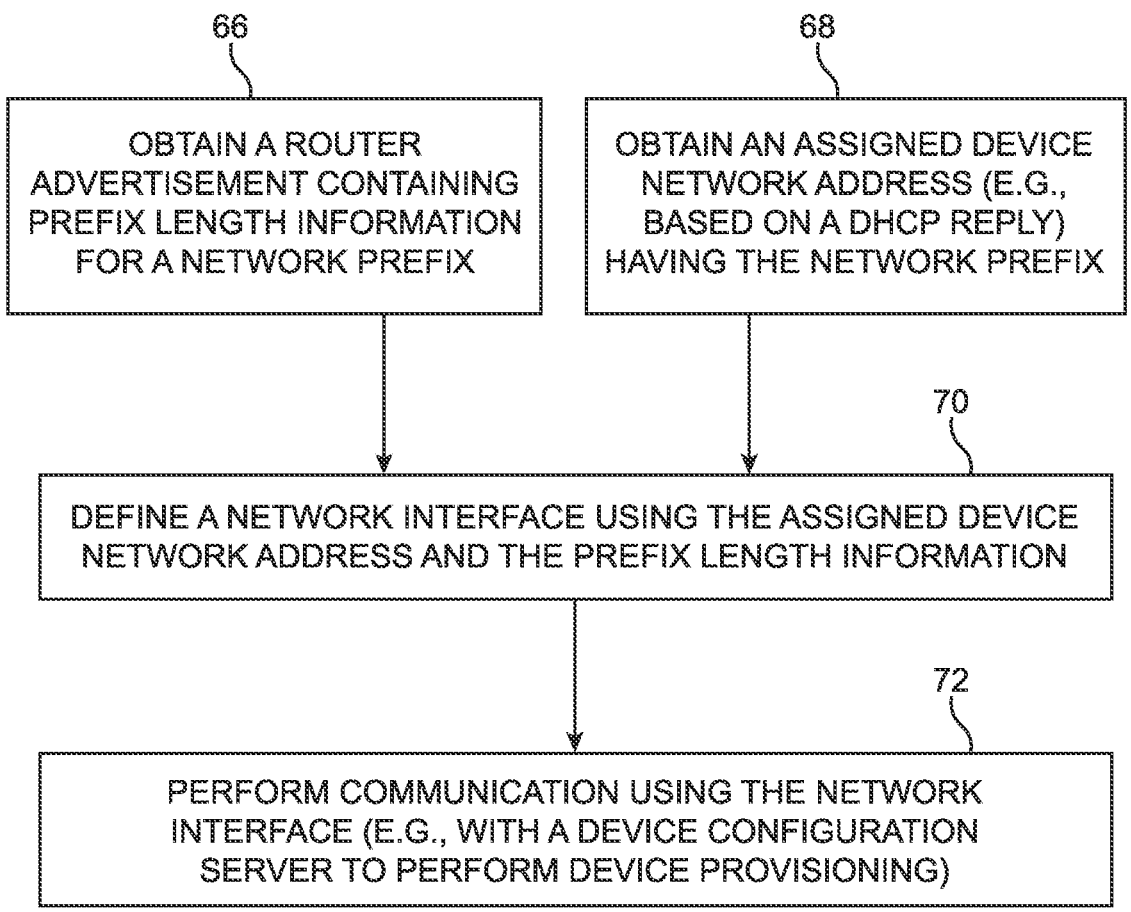
FIG. 6 is a flowchart of illustrative operations for correlating a device network address from a first source with a network address prefix from a second source in accordance with some embodiments.

FIG. 6 is a flowchart of illustrative operations for correlating a device network address from a first source with a network address prefix from a second source. These operations may be performed at one or more processors of processing circuitry 28 in device 10. The illustrative operations described in connection with FIG. 6 may generally be performed by processing circuitry 28 in device 10 executing software instructions stored on memory circuitry 30. If desired, one or more operations described in connection with FIG. 6 may be performed by other dedicated hardware components in device 10.

In illustrative configuration described herein as an example, the operations described in connection with FIG. 6 may be performed by device provisioning agent 36 and kernel 38 or generally processing circuitry 28 on which they are implemented.

At block 66, network device 10 (e.g., device provisioning agent 36 on processing circuitry 28) may obtain a router advertisement message containing prefix length information for a network prefix. As an example, device provisioning agent 36 may receive a router advertisement message 42 (FIG. 3) from router 12. The message 42 and/or a desired subset of information in message 42 may be stored on memory circuitry 30 (FIG. 2) as a record in router advertisement information 50 (e.g., record 56-1 or 56-2). The record may include network prefix information such as an IPv6 address prefix and a prefix length value and may also include information validating the record such as an on-link flag (e.g., being a set (enabled) or un-set (disabled)) and a valid lifetime field (e.g., having a numeral value).

At block 68, network device 10 (e.g., device provisioning agent 36 on processing circuitry 28) may obtain an assigned device network address having the network prefix. As an example, device provisioning agent 36 may receive a DHCPv6 reply message (e.g., message 46 in FIG. 3) based on a DHCPv6 request message (e.g., message 44 in FIG. 3). The DHCPv6 reply message may include an assigned IPv6 address for network device 10 but may lack information indicative of the actual network prefix (e.g., an IPv6 address prefix and a prefix length value). The assigned IPv6 address may be compared to one or more records of router advertisement messages to determine the router advertisement message specifying a network prefix matching the assigned IPv6 address.

In scenarios where multiple router advertisement messages each specifying a different network prefix that matches the assigned IPv6 address, block 66 may refer to the record associated with the router advertisement message containing the longer or longest matching prefix length.

If desired, the operations of block 66 may occur continuously as router advertisement messages from routers are received by device 10 continuously over time. While blocks 66 and 68 are shown to occur in parallel, this is merely illustrative. If desired, an initial solicited router advertisement message may be obtained and stored prior to obtaining the assigned device network address and/or subsequent unsolicited router advertisement message(s) may be obtained and stored while or after obtaining the assigned device network address. The router advertisement message referred to in block 66 may refer to either the initial solicited router advertisement message or the subsequent router advertisement message.

Prefix length information from block 66 and the assigned network address from 68 may be used to generate one or more IPv6 interfaces for device 10 by providing this information to kernel 38.

At block 70, network device 10 (e.g., kernel 38 on processing circuitry 28) may generate and define one or more network interfaces using the assigned device network address and the prefix length information. As an example, kernel 38 may receive the assigned device IPv6 address information (e.g., address 52 in FIG. 4) and the default IPv6 prefix length (e.g., length 54 having a value of 64 or 128 in the example of FIG. 4) based on the DHCPv6 reply message (e.g., message 46 in FIG. 3). Kernel 38 may also receive the prefix length specified in a valid router advertisement record (e.g., prefix 62-2 of record 56-2 in FIG. 5). Kernel 38 may selectively use the assigned device IPv6 address information based on the DHCPv6 reply message and the prefix length specified in a valid router advertisement record to set up one or more IPv6 interfaces.

At block 72, network device 10 (e.g., device provisioning agent 36 on processing circuitry 28) may perform communication using the one or more generated network interfaces. As an example, device provisioning agent 36 may perform further device provisioning (e.g., as part of the provisioning operation) by using the one or more generated network (e.g., IPv6) interfaces to communicate with a device configuration server to download configuration files for the provisioning process (e.g., configuration scripts for execution, configuration data for storage, etc.) and/or to perform communication that generally furthers the provisioning operation.

The operations described in connection with FIG. 6 are merely illustrative. If desired, one or more these operations may be omitted and/or changed. If desired, one or more additional operations may be performed as part of each of the operations described in connection with FIG. 6. If desired, some operations described in connection with FIG. 6 may be performed in parallel with each other (e.g., across multiple components such as across multiple processors of device 10) and/or some operations described in connection with FIG. 6 may be performed sequentially (e.g., at only a single component such as at a processor of network device 10).

The methods and operations described above in connection with FIGS. 1-6 may be performed by the components of one or more network devices and/or server or other host equipment using software, firmware, and/or hardware (e.g., dedicated circuitry or hardware). Software code for performing these operations may be stored on non-transitory computer readable storage media (e.g., tangible computer readable storage media) stored on one or more of the components of the network device(s) and/or server or other host equipment. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device(s) and/or server or other host equipment (e.g., processing circuitry 28 in network device 10, processing circuitry on router 12, processing circuitry on server equipment 14, etc.).

The foregoing is merely illustrative and various modifications can be made to the described embodiments. The foregoing embodiments may be implemented individually or in any combination.

What is claimed is:

1. A method for obtaining Internet Protocol (IP) address information of a network device, the method comprising:
   receiving, by the network device, a device network address assignment message that indicates an IP address of the network device;
   receiving, by the network device, a router advertisement message that indicates an IP address prefix associated with the IP address and that indicates a prefix length of the IP address prefix;
   forming, by the network device, an IP interface that specifies the IP address indicated by the received device network address assignment message and that specifies the prefix length indicated by the received router advertisement message; and
   communicating, by the network device, with external equipment using the formed IP interface that specifies the IP address and the prefix length.

2. The method of claim 1, wherein the device network address assignment message lacks an indication of the prefix length of the IP address.

3. The method of claim 1, wherein the IP address is an Internet Protocol version 6 (IPv6) address.

4. The method of claim 3, wherein the device network address assignment message comprises a Dynamic Host Configuration Protocol version 6 (DHCPv6) reply message.

5. The method of claim 4 further comprising:
   sending a DHCPv6 request message, wherein the DHCPv6 reply message is responsive to the DHCPv$_6$ request message.

6. The method of claim 1 further comprising:
   sending a router solicitation message, wherein the router advertisement message is responsive to the router solicitation message.

7. The method of claim 6, wherein the device network address assignment message is received after the router advertisement message is received.

8. The method of claim 1, wherein the router advertisement message is a message unsolicited by the network device.

9. The method of claim 1 further comprising:
   receiving, by the network device, an additional router advertisement message that indicates an additional IP address prefix associated with the IP address and that indicates an additional prefix length of the additional IP address prefix;

storing a first router advertisement record containing the IP address prefix and the prefix length; and storing a second router advertisement record containing the additional IP address prefix and the additional prefix length.

10. The method of claim 9, wherein forming the IP interface that specifies the IP address and the prefix length is based on an indication that the prefix length is longer than the additional prefix length or is based on an indication that the first router advertisement record is a valid record and the second router advertisement record is not a valid record.

11. The method of claim 1, wherein the external equipment is a device configuration server.

12. An un-provisioned network device configured to initiate a self-provisioning operation when coupled to a network, the un-provisioned network device comprising:
a packet processor;
memory circuitry; and
processing circuitry coupled to the memory circuitry and the packet processor and configured to perform the self-provisioning operation by:
receiving a device network address assignment message that indicates a network address of the un-provisioned network device;
storing, at the memory circuitry, one or more records of router advertisement messages each indicating a corresponding network address prefix and a prefix length of the corresponding network address prefix;
comparing the network address to each network address prefix in the one or more records to identify a matching network address prefix; and
obtaining a configuration file using a network interface, wherein the network interface is based on the network address and the prefix length of the matching network address prefix.

13. The un-provisioned network device defined in claim 12, wherein the device network address assignment message comprises a Dynamic Host Configuration Protocol version 6 (DHCPv6) reply message and the network address comprises an Internet Protocol version 6 (IPv6) address.

14. The un-provisioned network device defined in claim 12 further comprising:
validating the one or more records to identify valid records and invalid records, wherein the matching network address prefix belongs to one of the valid records.

15. The un-provisioned network device defined in claim 14, wherein the valid records each have an on-link flag that is set and a valid lifetime value that is non-zero.

16. The un-provisioned network device defined in claim 12, wherein the device network address assignment message is received from a network address assignment server and wherein the configuration file is obtained from a device configuration server.

17. The un-provisioned network device defined in claim 12, wherein the configuration file comprises configuration scripts executable by the processing circuitry and configuration data to be stored on the memory circuitry and wherein the packet processor is configured to process network traffic based on the configuration data.

18. A method of network device provisioning, the method comprising:
receiving, by a network device, a Dynamic Host Configuration Protocol (DHCP) message that contains an indication of an Internet Protocol (IP) address of the network device;
receiving, by the network device, a router advertisement message that contains an indication of an IP address prefix associated with the IP address and that contains an indication of a prefix length of the IP address;
providing, by the network device, an IP interface using the IP address and the prefix length; and
receiving, by the network device and using the IP interface, device configuration information from a bootstrap server.

19. The method defined in claim 18 further comprising:
storing a record of the router advertisement message amongst a plurality of records of router advertisement messages; and
identifying the record of the router advertisement message based on a comparison between the IP address and at least some records in the plurality of records of router advertisement messages.

20. The method defined in claim 18 further comprising:
receiving, by a kernel on a processor of the network device, the IP address, the prefix length, and a default prefix length, wherein the kernel provides the IP interface using the IP address and the prefix length.

* * * * *